United States Patent
Ma et al.

(10) Patent No.: US 12,541,858 B2
(45) Date of Patent: Feb. 3, 2026

(54) IMAGE DETECTION USING MULTIPLE SEGMENTATION MODELS AND FROM MULTIPLE DETECTION DIMENSIONS

(71) Applicant: Lenovo (Beijing) Limited, Beijing (CN)

(72) Inventors: Dizhi Ma, Beijing (CN); Xiao Xu, Beijing (CN)

(73) Assignee: LENOVO (BEIJING) LIMITED, Beijing (CN)

(*) Notice: Subject to any disclaimer, the term of this patent is extended or adjusted under 35 U.S.C. 154(b) by 448 days.

(21) Appl. No.: 18/180,434

(22) Filed: Mar. 8, 2023

(65) Prior Publication Data

US 2023/0316535 A1    Oct. 5, 2023

(30) Foreign Application Priority Data

Mar. 30, 2022 (CN) .......................... 202210331903.2

(51) Int. Cl.
| | |
|---|---|
| *G06T 7/00* | (2017.01) |
| *G06T 5/50* | (2006.01) |
| *G06T 7/149* | (2017.01) |
| *G06T 7/194* | (2017.01) |

(52) U.S. Cl.
CPC .............. *G06T 7/194* (2017.01); *G06T 5/50* (2013.01); *G06T 7/149* (2017.01); *G06T 2207/20081* (2013.01); *G06T 2207/20221* (2013.01)

(58) Field of Classification Search
CPC . G06T 2207/20081; G06T 2207/20084; G06T 7/11; G06T 7/194; G06T 2207/20221; G06T 7/75; G06T 5/60; G06T 2207/20132; G06V 10/25; G06V 10/764; G06V 10/774; G06V 10/82
See application file for complete search history.

(56) References Cited

U.S. PATENT DOCUMENTS

| | | | |
|---|---|---|---|
| 2012/0288186 A1* | 11/2012 | Kohli ................... | G06V 10/772 382/159 |
| 2014/0270350 A1* | 9/2014 | Rodriguez-Serrano ..................... | G06F 18/21 382/103 |
| 2021/0370993 A1* | 12/2021 | Qian ..................... | B61L 23/042 |
| 2023/0118460 A1* | 4/2023 | Liba ........................ | G06T 7/155 |

* cited by examiner

*Primary Examiner* — Li Liu
(74) *Attorney, Agent, or Firm* — ANOVA LAW GROUP, PLLC

(57) ABSTRACT

An image detection method includes processing a to-be-processed image based on a first segmentation model to obtain a to-be-detected image corresponding to a to-be-detected object. The to-be-processed image is obtained when the to-be-detected object is located in a scene. The method further includes detecting the to-be-detected image to obtain a detection result corresponding to the to-be-detected object. The first segmentation model is trained using a first label that is determined based on a second segmentation model. The second segmentation model is obtained by training using at least a fused image carrying a second label. The fused image is generated by fusing a sub-image corresponding to a detection object and a sub-image corresponding to another scene. The sub-image corresponding to the detection object is determined based on the second label.

20 Claims, 11 Drawing Sheets

IMAGE DETECTION USING MULTIPLE SEGMENTATION MODELS AND FROM MULTIPLE DETECTION DIMENSIONS

CROSS-REFERENCES TO RELATED APPLICATION

This application claims priority to Chinese Patent Application No. 202210331903.2, filed on Mar. 30, 2022, the entire content of which is incorporated herein by reference.

FIELD OF TECHNOLOGY

The present disclosure relates to the field of computer processing technology and, more specifically, to an image detection method, device, and apparatus, and a storage medium.

BACKGROUND

In the process of performing safety inspection of the high-speed rail by the inspection vehicle, due to the complex background in the tunnel, the background is easily confused with the parts and the defects that need to be detected. Therefore, it is difficult to detect the parts and defects from the collected images, resulting in a large number of false detections. In addition, due to the complex background, the interference is significant, and the application of anomaly detection algorithm is also difficult to realize.

SUMMARY

In accordance with the disclosure, there is provided an image detection method including processing a to-be-processed image based on a first segmentation model to obtain a to-be-detected image corresponding to a to-be-detected object. The to-be-processed image is obtained when the to-be-detected object is located in a scene. The method further includes detecting the to-be-detected image to obtain a detection result corresponding to the to-be-detected object. The first segmentation model is trained using a first label that is determined based on a second segmentation model. The second segmentation model is obtained by training using at least a fused image carrying a second label. The fused image is generated by fusing a sub-image corresponding to a detection object and a sub-image corresponding to another scene. The sub-image corresponding to the detection object is determined based on the second label.

Also in accordance with the disclosure, there is provided an electronic device including a processor and a memory storing a program that, when executed, causes the processor to process a to-be-processed image based on a first segmentation model to obtain a to-be-detected image corresponding to a to-be-detected object. The to-be-processed image is obtained when the to-be-detected object is located in a scene. The program further causes the processor to detect the to-be-detected image to obtain a detection result corresponding to the to-be-detected object. The first segmentation model is trained using a first label that is determined based on a second segmentation model. The second segmentation model is obtained by training using at least a fused image carrying a second label. The fused image is generated by fusing a sub-image corresponding to a detection object and a sub-image corresponding to another scene. The sub-image corresponding to the detection object is determined based on the second label.

Also in accordance with the disclosure, there is provided a non-transitory computer-readable storage medium storing computer-executable instructions that, when executed by a processor, cause the processor to process a to-be-processed image based on a first segmentation model to obtain a to-be-detected image corresponding to a to-be-detected object. The to-be-processed image is obtained when the to-be-detected object is located in a scene. The instructions further cause the processor to detect the to-be-detected image to obtain a detection result corresponding to the to-be-detected object. The first segmentation model is trained using a first label that is determined based on a second segmentation model. The second segmentation model is obtained by training using at least a fused image carrying a second label. The fused image is generated by fusing a sub-image corresponding to a detection object and a sub-image corresponding to another scene. The sub-image corresponding to the detection object is determined based on the second label.

DETAILED DESCRIPTION

Hereinafter, aspects, features, and embodiments of the present disclosure will be described with reference to the accompanying drawings. Such description is illustrative only but is not intended to limit the scope of the present disclosure. In addition, it will be understood by those skilled in the art that various modifications in form and details may be made therein without departing from the spirit and scope of the present disclosure.

Although the present application has been described with reference the specific embodiments, many other equivalents of the present disclosure may be implemented by those skilled in the art with features of the claims of the present disclosure, and are therefore within the scope of protection defined herein.

Embodiments of the present disclosure are described hereinafter with reference to the accompanying drawings. However, these embodiments are merely examples of the present disclosure, which may be implemented in various ways. Well-known and/or repetitive functions or structures are not described in detail in order to clarify the true intent based on a user's operation history, and avoid unnecessary details that may obscure the present disclosure. Therefore, the specific structural and functional details of the present disclosure are not intended to be limiting, but are merely used as the representative basis of the claims to teach those skilled in the art to use the present disclosure in virtually any suitable and detailed structure.

In the specification, terms such as "in one embodiment," "in another embodiment," "in an additional embodiment," or "in other embodiments" may all refer to one or more the same or different embodiments of the present disclosure.

Figure 1:
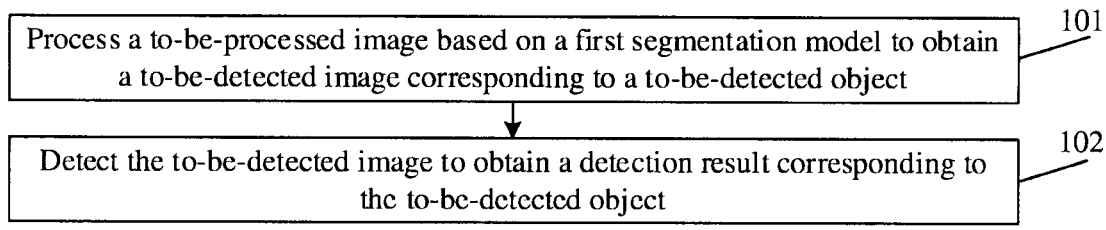
FIG. 1 is a flowchart of an image detection method according to an embodiment of the present disclosure.

FIG. 1 is a flowchart of an image detection method according to an embodiment of the present disclosure. The image detection method will be described in detail below.

101, processing a to-be-processed image based on a first segmentation model to obtain a to-be-detected image corresponding to a to-be-detected object.

In some embodiments, the to-be-processed image may be obtained when the to-be-detected object is located in the scene where it is located.

In some embodiments, the to-be-detected object may be a part, such as a hanging cable, a current-carrying ring, a catenary cable, etc., and the to-be-detected object may be located in the scene where it is located can be understood as the to-be-detected object is located in the real scene, such as inside a tunnel or outside a tunnel. In this case, the to-be-detected image may be an image including parts and background collected in the real scene, such as an image collected inside the tunnel including a part and a background inside the tunnel, or an image collected outside the tunnel including a part and a background outside the tunnel.

In some embodiments, the to-be-processed image may include a plurality of to-be-detected objects. The to-be-processed image may include a plurality of parts, a plurality of connectors, or a plurality of parts and a plurality of connectors.

In some embodiments, the to-be-detected image may be a sub-image corresponding to the to-be-detected object. For example, if the to-be-detected object is a hanging cable, the to-be-detected image may be an image including only the hanging cable but not the background; and if the to-be-detected object is a fastener, the to-be-detected image may be an image including only the fastener but not the background.

In some embodiments, the to-be-detected image may be an image obtained by segmenting the to-be-detected object from the to-be-processed image by using the first segmentation model. In some embodiments, the to-be-processed image may include a plurality of to-be-detected objects, and a plurality of to-be-detected images may be obtained by segmenting the to-be-processed image using the first segmentation model, where one to-be-detected object may correspond to one to-be-detected image. In some embodiments, the to-be-processed image may include one to-be-detected object, and one to-be-detected image may be obtained by segmenting the to-be-processed image using the first segmentation model.

In some embodiments, a first label used to train the first segmentation model may be determined based on a second segmentation model. The second segmentation model may be obtained by training a plurality of fused images carrying a second label. The fused image may be formed by fusing sub-images corresponding to the detection object and sub-images corresponding to other scenes, and the sub-images corresponding to the detection object may be determined based on the second label.

In some embodiments, the first label may be obtained based on the label output by the second segmentation model. The second label may be a mask, contour information, etc., and may be a label of the sub-images corresponding to the detection object, which can be generated during the process of determining the sub-images corresponding to the detection object. In some embodiments, the second label may be the label of a primary model input, and the first label may be the label of a secondary model training input. In some embodiments, the first label may be obtained by manually adjusting the label output by the second segmentation model, such that a more accurate first label can be obtained.

In some embodiments, sub-images corresponding to other scenes may be background images. The sub-images corresponding to other scenes may be understood as complex background images. That is, when the parts are located in a complex background image, such as a background image in a tunnel, the detection difficulty of the parts will increase. Due to the complex background in the tunnel, the background can be easily confused with the parts, therefore, the detection difficulty of the parts is increased.

In some embodiments, the sub-image corresponding to the detection object may be determined from an image with a simple background, such as an image outside the tunnel, and the detection object. In this case, the detection difficulty of the to-be-detected object from the image will be reduced. Since the background outside the tunnel is relatively simple, the background and the detection object are not easily confused, therefore, the detection difficulty of the detection object is reduced.

In some embodiments, the detection object and the sub-image corresponding to the detection object may be used in a model training process, and the to-be-detected object and the to-be-processed image may be used in a model application process.

In some embodiments, the sub-image corresponding to the detection object may be determined based on the second label. That is, the second label may be used to determine the sub-image corresponding to the detection object. In practical applications, after the sub-image corresponding to the detection object is determined based on the second label, the sub-image corresponding to the detection object carrying the second label and the sub-images corresponding other scenes may be fused to obtain a fused image carrying the second label, thereby reducing the manual labelling cost.

102, detecting the to-be-detected image to obtain a detection result corresponding to the to-be-detected object.

In some embodiments, the detection result may indicate that the to-be-detected object has a security risk. In some embodiments, the detection result may indicate that the to-be-detected object does not have a security risk. In some embodiments, the detection result may indicate that the to-be-detected object has one or more security risks, where the one or more security risks may be the same or different.

In some embodiments, the detection may be a detection of a plurality of to-be-detected images at the same time, or a detection of one to-be-detected image. The purpose of the detection is to determine the safety of the to-be-detected object in the to-be-detected image. When the detection result indicates that the to-be-detected object cannot be used safely, the maintenance personnel can carry out the corresponding maintenance for the specific safety risk of the to-be-detected object.

In some embodiments, the detection may be achieved by a fast object detection algorithm. In some embodiments, a faster categorization algorithm may be directly used as a feature extraction network for target detection. In some embodiments, the target detection algorithm may be accelerated by a model acceleration compression algorithm, and then target detection can be performed. In some embodiments, the network structure may be redesigned to include the feature extraction and detection network.

In some embodiments, the detection may be realized by the following process. First, feature extraction may be performed on the to-be-detected image; second, a region may be generated based on the extracted features, where the region may be a pre-selected box including the to-be-detected object; lastly, categorization or localization regression may be performed on the images corresponding to the region through a convolutional neural network to obtain the category information and position information of the to-be-detected object.

In some embodiments, the detection may be realized by the following process. First, feature extraction may be performed on the to-be-detected image; then, category or localization regression may be performed on the extracted features through the convolutional neural network to obtain the category information and position information of the to-be-detected object.

Consistent with the present disclosure, first, the to-be-processed image may be processed based on the first segmentation model to obtained the to-be-detected image corresponding to the to-be-detected object, where the to-be-processed image may be obtained when the to-be-detected object is located in the scene where it is located. The first label used to train the first segmentation model may be determined based on the second segmentation model, and the second segmentation model may be obtained by training a plurality of fused images carrying the second label. The fused image may be formed by fusing the sub-images corresponding to the detection object and the sub-images corresponding other scenes, and the sub-images corresponding to the detection object may be determined on the second label. Subsequently, a detection may be performed on the to-be-detected image to obtained a detection result corresponding to the to-be-detected object. In this way, the first segmentation model trained based on a large number of fused images carrying the second label can be used to process the to-be-processed image to reduce the cost of manual labelling and accurately detect parts from complex backgrounds, thereby improving segmentation accuracy and detection accuracy.

In some embodiments, the first segmentation model may be obtained by training a plurality of processed images carrying the first label, and the first label may be obtained by predicting the processed image based on the second segmentation model.

In some embodiments, the processed images may be understood as real images with complex backgrounds during model training. The difference between the processed image and the to-be-processed image is that the to-be-processed image may be an input image of the model application process, while the processed image may be the verification image of the model training process. Correspondingly, the first label may be understood as a real label. In some embodiments, the first label may be an accurate label obtained by manually adjusting the label output by the second segmentation model. For example, based on human experience, the erroneous labels output by the second segmentation model may be adjusted to make them more accurate.

Figure 2:
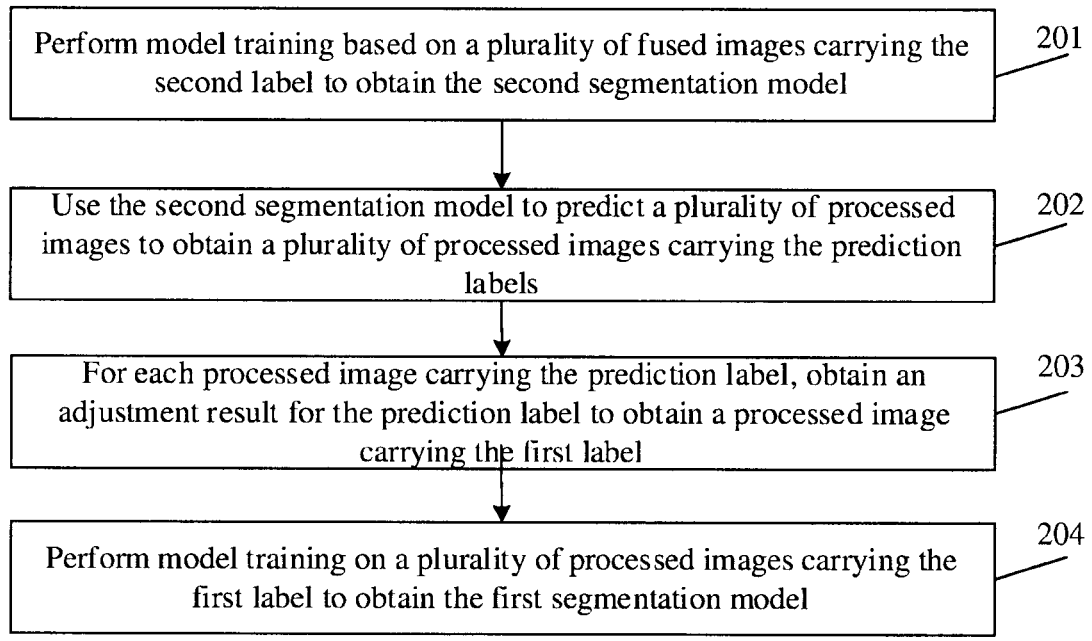
FIG. 2 is a flowchart of the image detection method according to an embodiment of the present disclosure.

FIG. 2 is a flowchart of the image detection method according to an embodiment of the present disclosure. As shown in FIG. 2, the training method of the first segmentation model may include the following processes.

201, performing model training based on a plurality of fused images carrying the second label to obtain the second segmentation model.

202, using the second segmentation model to predict a plurality of processed images to obtain a plurality of processed images carrying prediction labels.

In some embodiments, the processed image may be used to verify the labelling effect of the second segmentation model on real images with complex backgrounds. That is, the second segmentation model may be used to predict the processed image (e.g., the real image with complex background) to obtain the prediction label of the real image with complex background. In some embodiments, the prediction label may be a mask, contour information, etc.

203, for each processed image carrying the prediction label, obtaining an adjustment result for the prediction label to obtain a processed image carrying the first label.

In some embodiments, the adjustment of the prediction label may be the adjustment of the label with the error output by the second segmentation model. In some embodiments, the contour parameters of the second label may be adjusted, such as adjusting the smoothness of the contour.

204, performing model training on a plurality of processed images carrying the first label to obtain the first segmentation model.

In some embodiments, the first segmentation model and the second segmentation model may be the same or different. In some embodiments, the first segmentation model may be obtained by optimizing the second segmentation model. For example, a plurality of fused images carrying the second label may be used to train the model once to obtain the second segmentation model, then a plurality of processed images carrying the second label may be used to perform secondary training on the model to obtain the first segmentation model. In some embodiments, the first segmentation model may be obtained by performing model training on a segmentation model different from the second segmentation model. For example, a plurality of fused images carrying the second label may be used to train the model to obtain the second segmentation model, then a plurality of processed images carrying the first label may be used to train the model to obtain the first segmentation model. In some embodiments, the training model for the first segmentation model may be different from the training model for the second segmentation model.

In the embodiments of the present disclosure, a model training based on a plurality of fused images carrying the second label may be performed to obtain the second segmentation model, then the second segmentation model may be used to detect a plurality of processed images to obtain a plurality of processed images carrying the prediction labels. Subsequently, for each of the processed images carrying the prediction label, an adjustment result for the prediction label may be obtained to obtain a processed image carrying the first label. Then, model training may be performed based on a plurality of processed images carrying the first label to obtain the first segmentation model. In this way, the labelling cost of real images can be reduced and a model with higher accuracy can be obtained.

Figure 3:
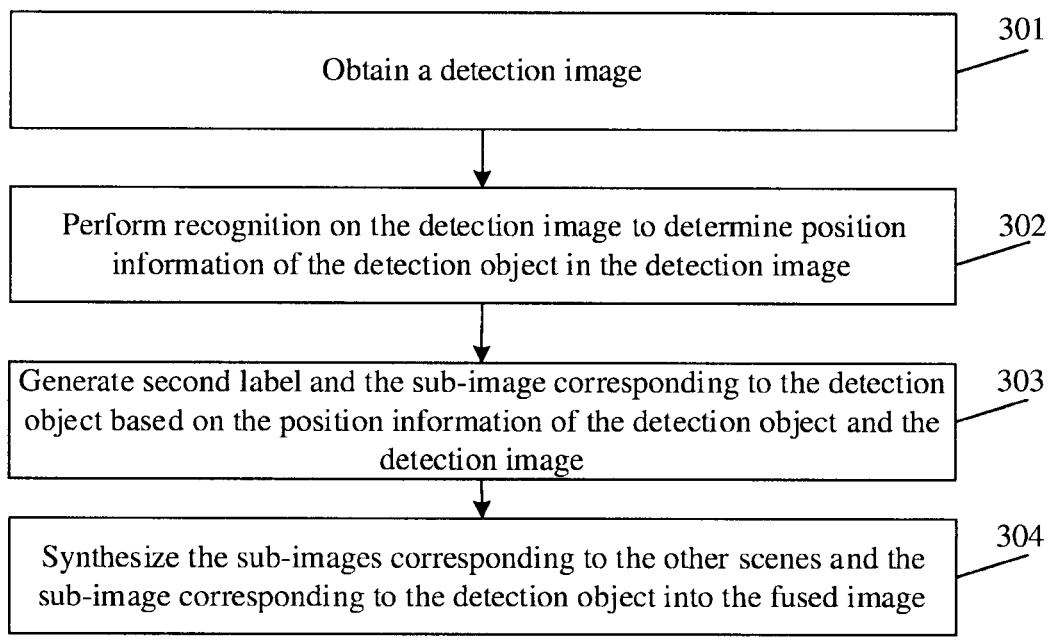
FIG. 3 is a flowchart of the image detection method according to an embodiment of the present disclosure.

FIG. 3 is a flowchart of the image detection method according to an embodiment of the present disclosure. As shown in FIG. 3, the method for obtaining the fused images may include the following processes.

301, obtaining a detection image.

In some embodiments, the detection image may include the detection object. In the embodiments of the present disclosure, the detection image may be understood as an image used to extract the sub-image corresponding to the detection object, including the detection object and the background, and the background is simple, such as an image outside the tunnel. Since the background outside the tunnel is simple, the background and the detection object are not easily confused. Therefore, the detection difficulty of the detection object is reduced, and the sub-image corresponding to the detection object is easy to obtain, which reduces the difficulty of sample acquisition.

302, performing recognition on the detection image to determine position information of the detection object in the detection image.

In some embodiments, the detection image may be detected by the target detection algorithm to determine the position information of the detection object in the detection image. In some embodiments, the position information may be understood as a pre-selection box including the detection object.

303, generating the second label and the sub-image corresponding to the detection object based on the position information of the detection object and the detection image.

In some embodiments, the second label may not only be used to determine the sub-image corresponding to the detection object, but also be output with the sub-image corresponding to the detection object at the same time as the label of the detection object. The second label may be a mask, contour information, etc. In some embodiments, the process at 303 may be realized through the following process. First, based on the position information of the detection object, the part of the detection image where the detection object is located may be copied. Then, based on part of the detection image, the mask or contour information of the detection object may be determined. Subsequently, the sub-image corresponding to the detection object may be extracted from the detection image based on the mask or contour information of the detection object.

304, synthesizing the sub-images corresponding to the other scenes and the sub-image corresponding to the detection object into the fused image, the fused image carrying the second label.

In some embodiments, the sub-images corresponding to other scenes may be understood as complex background images for model training. In some embodiments, the complex background images of other scenes collected may be directly used as sub-images corresponding to other scenes. In other embodiments, the complex background images of other scenes collected may be down-sampled to obtain sub-images corresponding to other scenes. In some embodiments, the size of the sub-images corresponding to other scenes may be greater than or equal to the size of the sub-images corresponding to the detection object. In addition, since the second label may be output simultaneously with the sub-image corresponding to the detection object, the fused image composed of sub-images corresponding to other scenes and the sub-image corresponding to the detection object may carry the second label.

In some embodiments, a small number of sub-images corresponding to other scenes and the sub-image corresponding to the detection object may be synthesized by image enhancement to obtain a large number of fused images. In some embodiments, the sub-image corresponding to the detection object may be subjected to spatial transformation (such as rotation, scaling, mirroring, translation, etc.), and then synthesized with sub-images corresponding to other scenes to obtain a large number of fused images. In other embodiments, the sub-images corresponding to other scenes may be subjected to spatial transformation (such as rotation, scaling, mirroring, translation, etc.), and then synthesized with sub-image corresponding to the detection object to obtain a large number of fused images.

In the embodiments of the present disclosure, a detection image may be obtained, the detection image including the detection object; then, recognition may be performed on the detection image to determine the position information of the detection object in the detection image; subsequently, the second label and the sub-image corresponding to the detection object may be generated based on the position information of the detection object and the detection image; next, the sub-images corresponding to the other scenes and the sub-image corresponding to the detection object may be synthesized into the fused image, the fused image carrying the second label. In this way, a large number of fused images carrying the second label can be obtained based on a small number of sub-images corresponding to other scenes and sub-images corresponding to the detection object, thereby reducing the cost of manual labelling.

Figure 4:
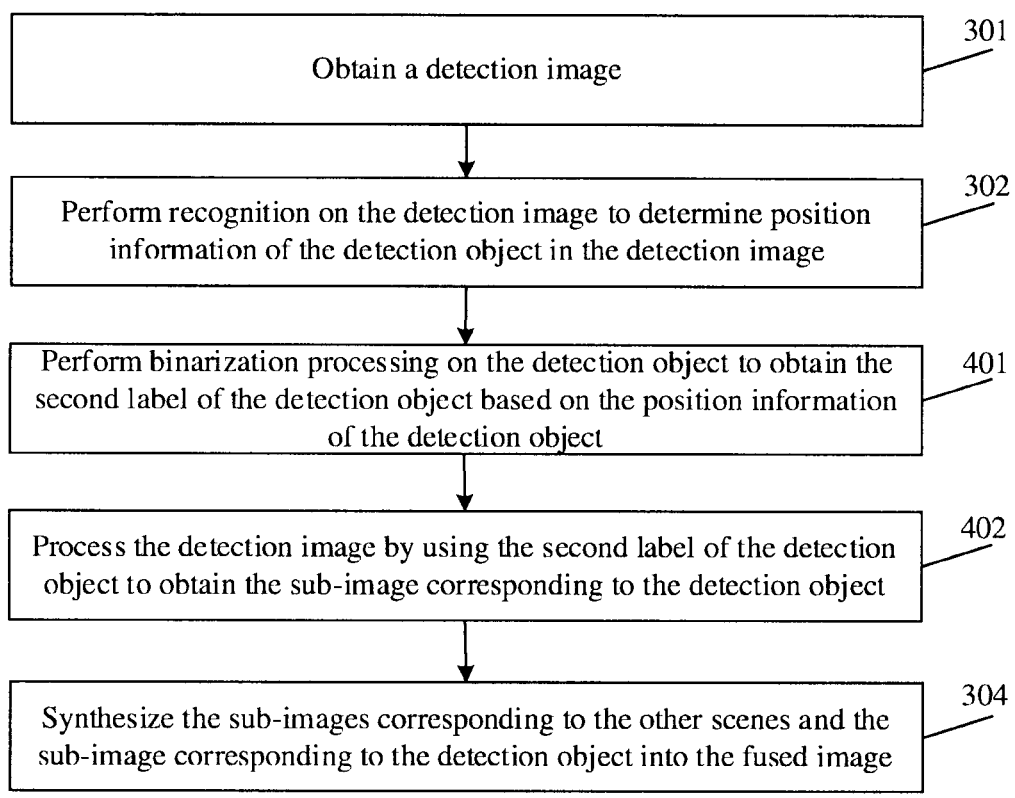
FIG. 4 is a flowchart of the image detection method according to an embodiment of the present disclosure.

FIG. 4 is a flowchart of the image detection method according to an embodiment of the present disclosure. As shown in FIG. 4, the process at 303 may include the following processes.

401, performing binarization processing on the detection object to obtain the second label of the detection object based on the position information of the detection object.

In some embodiments, the second label may be a mask, contour information, etc. of the detection object.

When the second label is a mask of the detection object, the second label may be determined by the following process. First, based on the position information of the detection object, the detection object may be copied to obtain a copied image. Next, a segmentation threshold may be determined. Then, the pixel value of each pixel in the copied image may be calculated. Subsequently, the pixel whose pixel value is greater than or equal to the segmentation threshold may be used as the second label.

When the second label is the contour information of the detection object, the second label may be determined by the following process. First, edge detection may be performed on the detection object, then, the contour information of the detection object may be extracted based on the edge detection result.

402, processing the detection image by using the second label of the detection object to obtain the sub-image corresponding to the detection object.

In some embodiments, the area corresponding to the second label in the detection image may be determined as the sub-image corresponding to the detection object. In some embodiments, the sub-image corresponding to the detection object may be obtained by multiplying the second label of the detection object with the detection image, and the principle may include: multiply the pixels with a pixel value of 0 in the second label of the detection object by the pixels in the detection image, and change the pixel values of some pixels in the detection image to 0; and multiply the pixels with a pixel value of 1 in the second label of the detection object by the pixels in the detection image, and keep the pixel values of some pixels in the detection image unchanged. In this way, the image composed of pixels with constant pixel values in the detection image may be determined as the sub-image corresponding to the detection object. In some embodiments, the area corresponding to the contour information of the detection object may be determined as the sub-image corresponding to the detection object.

In the embodiments of the present disclosure, based on the position information of the detection object, binarization processing may be performed on the detection object to obtain the second label of the detection object. Subsequently, the second label of the detection object may be used process the detection image to obtain the detection object corresponding to the detection object. In this way, the sub-image corresponding to the detection object can be determined from the detection image based on the second label of the detection object.

Figure 5A:
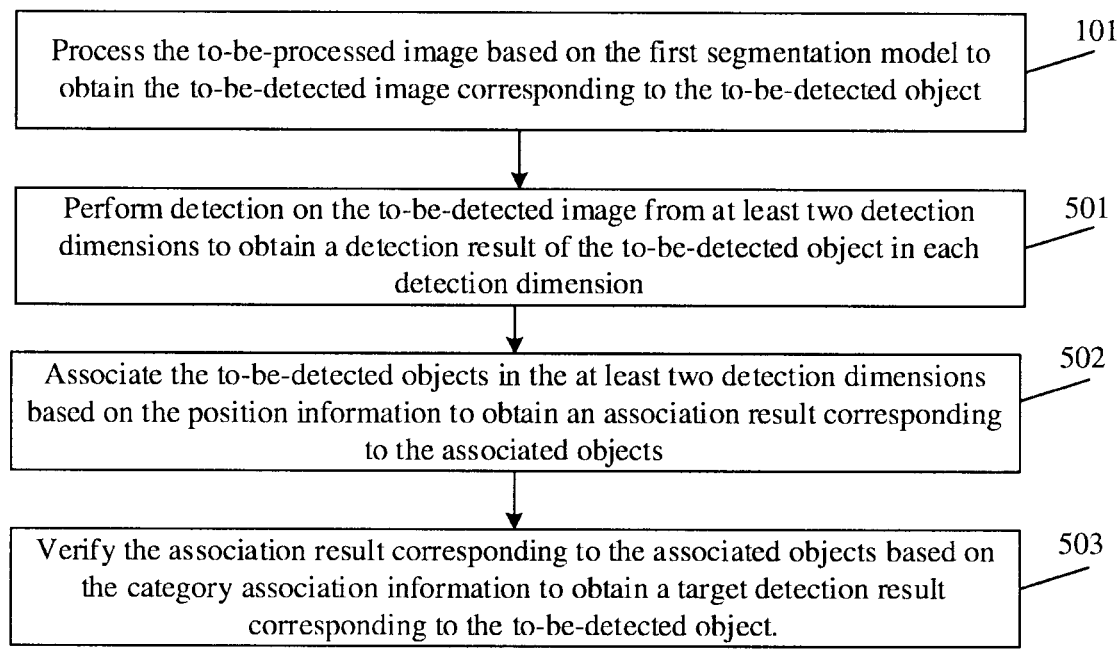
FIG. 5A is a flowchart of the image detection method according to an embodiment of the present disclosure.

FIG. 5A is a flowchart of the image detection method according to an embodiment of the present disclosure. As shown in FIG. 5A, the process at 102 may include the following processes.

501, performing detection on the to-be-detected image from at least two detection dimensions to obtain a detection result of the to-be-detected object in each detection dimension.

In some embodiments, the detection result may include position information and category information. In the embodiments of the present disclosure, there may be a corresponding relationship between the dimension, the to-be-detected object, and the detection result. The detection results may be different for different detection objects under different detection dimensions.

In some embodiments, the detection dimension may be the part detection dimension, the corresponding to-be-detected object being the part in the to-be-detected image, and the detection result being the position information and the category information of the part. For example, in the part detection dimension, the to-be-detected object may be part A, and the detection result may be position 1 and a hanging cable. In other embodiments, the detection dimension may be the defect detection dimension, the corresponding to-be-detected object being the defect in the to-be-detected image, and the detection result being the position information and the category information of the defect. For example, the to-be-detected object may be defect a, and the detection result may be position 2 and a damage.

In some embodiments, two object detection algorithms may be used to detect parts and defects separately. For example, a first target detection algorithm may be used to detect parts, and a second target detection algorithm may be used to detect defects. In some embodiments, the parts and detects in the to-be-detected image may be detected at the same time. In other embodiments, one of the parts and defects in the to-be-detected image may be detected, and then the remaining one may be detected.

502, associating the to-be-detected objects in the at least two detection dimensions based on the position information to obtain an association result corresponding to the associated objects.

In some embodiments, the association result may include category information corresponding to the associated object in each detection dimension. For example, part A and defect a may be determined as associated objects. The category information of part A may be the hanging cable, and the category information of the defect a may be the damage, then the hanging cable-damage may be taken as the associated result of part A and defect a.

Figure 5B:
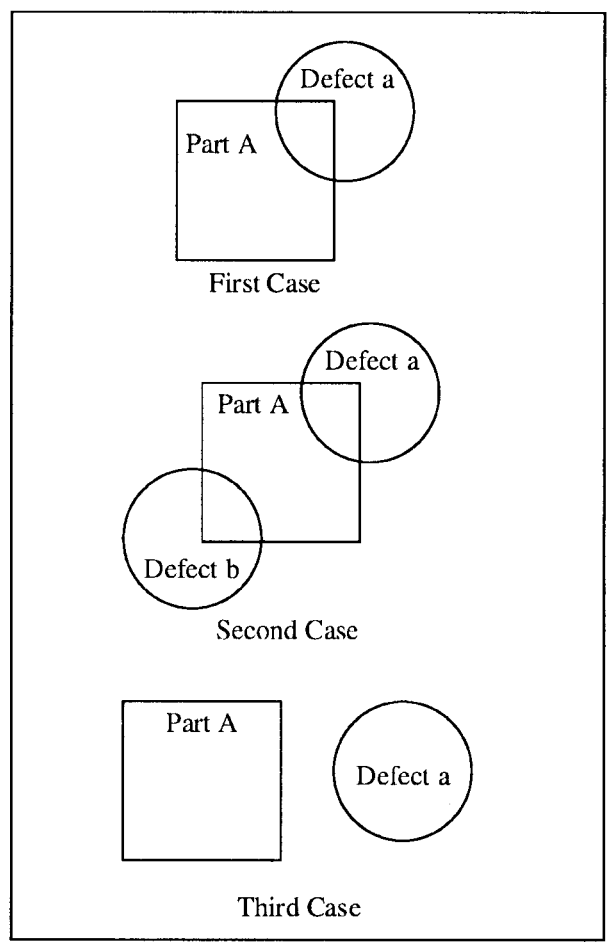
FIG. 5B is a flowchart of the image detection method according to an embodiment of the present disclosure.

In some embodiments, association may refer to matching parts and defects based on the position information of the parts and the position information of the defects to form a one-to-one correspondence between parts and defects, such as shown in FIG. 5B. For example, if the position information of part A and the position information of defect a indicate that there is an association between them, then part A and defect a may be associated to obtain a set of associated objects. In another example, if the position information of part A and the position information of defect a and defect b indicate that there an association between them, then part A and defect a may be associated, and part A and defect b may be associated to obtain two sets of associated objects.

503, verifying the association result corresponding to the associated objects based on the category association information to obtain a target detection result corresponding to the to-be-detected object.

In some embodiments, the category association information may be an association relationship between category information of at least two detection dimensions. The category association information may be understood as a one-to-one correspondence between category information of at least two preset detection dimensions. For example, objectively, the defects that may occur on part A are defect a and defect b, and the defect that may occur on part B is defect c, then a one-to-one correspondence may be established between part A-defect a, part A-defect b, and part B-defect c.

In some embodiments, the category association information may be understood as a database, and the association result corresponding to the associated objects may be verified based on the category association information. That is, the association result may be compared with the category association information in the database, if the category association information exists in the database, then the association result may be output, otherwise, the association result may be discarded. For example, when there is an association result of part A-defect a, the association result of part A-defect a may be compared with the category association information of part A-defect a, part A-defect b, and part B-defect c in the database. If the category association information is consistent with the association result, then the association result of part A-defect a may be output. Further, when there is an association result of part A-defect c, the association result of part A-defect c may be compared with the category association information of part A-defect a, part A-defect b, and part B-defect c in the database. If there is no consistent category association information with the association result of part A-defect c in the database, the association result of part A-defect c may be discarded.

In the embodiments of the present disclosure, the to-be-detected image may be detected from at least two detection dimensions, and the detection result of the to-be-detected object in each detection dimension may be obtained. Then, the to-be-detected objects in the at least two detection dimensions may be associated based on the position information to obtain the association result corresponding to the associated objects. Subsequently, the association result corresponding to the associated object may be verified based on the category association information, and the target detection result corresponding to the to-be-detected object may be obtained. In this way, the association result can be verified based on the preset category association information, thereby reducing false detections and improving detection accuracy.

Figure 6:
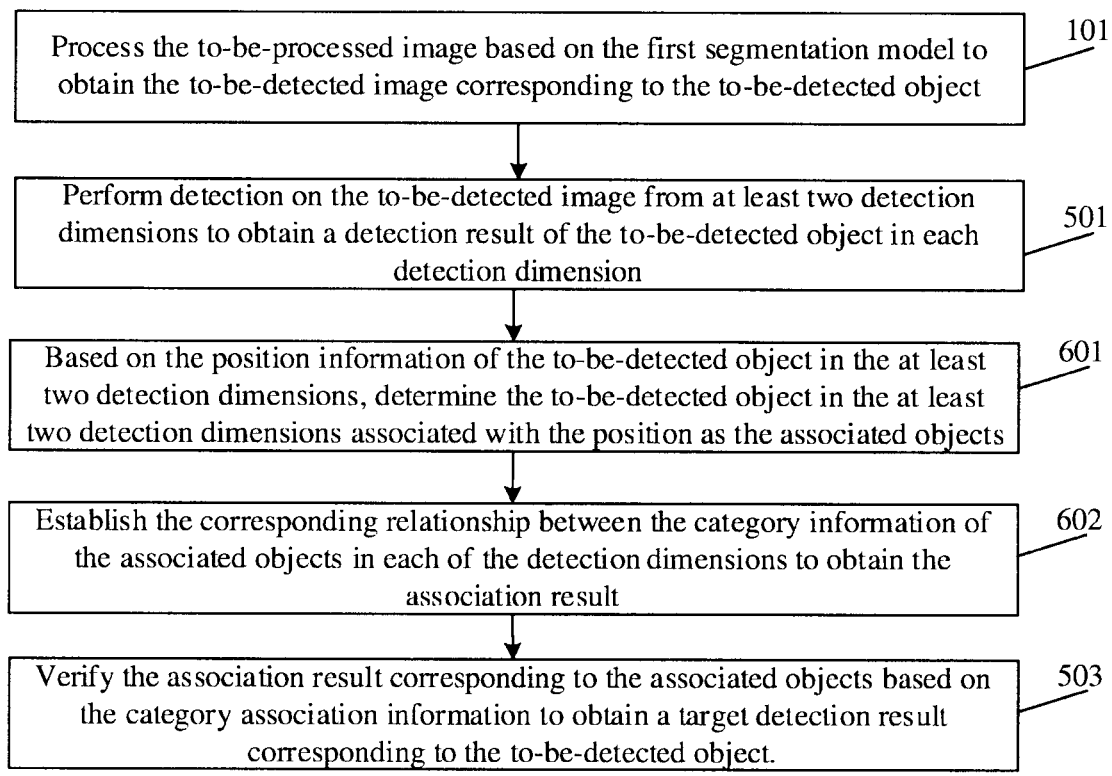
FIG. 6 is a flowchart of the image detection method according to an embodiment of the present disclosure.

FIG. 6 is a flowchart of the image detection method according to an embodiment of the present disclosure. As shown in FIG. 6, the process at 502 may include the following processes.

601, based on the position information of the to-be-detected object in the at least two detection dimensions, determining the to-be-detected object in the at least two detection dimensions associated with the position as the associated objects.

In some embodiments, the position association may be that the position information of the to-be-detected object in the two detection dimensions overlap. For example, if the position information of part A overlaps with the position information of defect a, then part A and defect a may be associated to obtain a set of associated objects. Further, if the position information of part A overlaps with the position information of defect a and defect b, then part A and defect a may be associated to obtain a set of associated objects.

In some embodiments, the position information may be an area. By comparing whether the areas of the to-be-detected objects in different detection dimensions overlap, and the to-be-detected objects in different detection dimensions may be associated with overlapping areas to obtain the associated objects. In the embodiments of the present disclosure, a set of associated objects may include a one-to-one correspondence. In some embodiments, the position information may be represented by coordinates.

602, establishing the corresponding relationship between the category information of the associated objects in each of the detection dimensions to obtain the association result.

In some embodiments, the association result may include the category information corresponding to the associated object in each detection dimension. For example, part A and defect a may be associated objects, the category information of part A may be "hanging cable," and the category information of defect a may be "damaged," then the association result may be "hanging cable-damaged". In another example, part A and defect a and part A and defect b may be associated objects, the category information of part A may be "hanging cable," the category information of defect a may be "damaged," and the category information of defect b may be "broken," then the association result may be "hanging cable-damaged" and "hanging cable-broken".

In the embodiments of the present disclosure, based on the position information of the to-be-detected object in the at least two detection dimensions, the to-be-detected object in the at least two detection dimensions associated with the position may be determined as the associated objects. Subsequently, the corresponding relationship between the category information of the associated objects in each of the detection dimension may be established to obtain the association result. In this way, based on the position information of the to-be-detected object in different detection dimensions, the category information of the to-be-detected object in different dimensions can be associated to determine which defect exists on which part.

In some embodiments, the category association information may include an association relationship of each of the preset objects among the plurality of preset objects, and the association relationship may include the category information corresponding to the preset object in each detection dimension.

Figure 7:
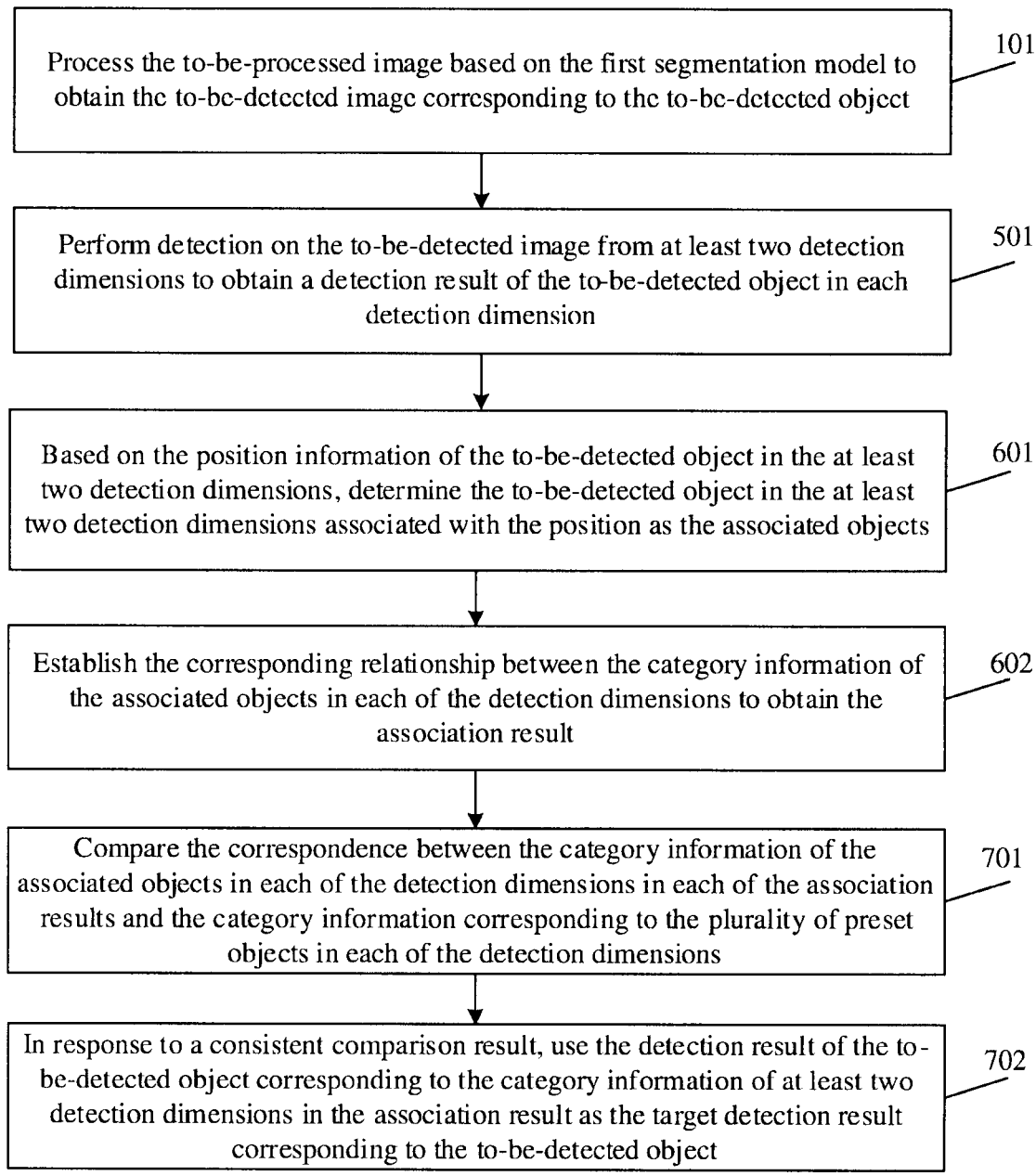
FIG. 7 is a flowchart of the image detection method according to an embodiment of the present disclosure.

FIG. 7 is a flowchart of the image detection method according to an embodiment of the present disclosure. As shown in FIG. 7, the process at 503 may include the following processes.

701, comparing the correspondence between the category information of the associated objects in each of the detection dimensions in each of the association results and the category information corresponding to the plurality of preset objects in each of the detection dimensions.

In some embodiments, preset objects may be understood as parts and defects that can be associated under objective circumstances. For example, under objective circumstances, the possible defects of part A are defect a, defect b, and defect c, then the preset objects may be part A-defect a, part A-defect b, and part A-defect c.

In some embodiments, the category information corresponding to the preset objects in each detection dimension may be understood as the correspondence between category information of preset objects. For example, if the category information of part A is "hanging cable," the category information of defect a is "broken," the category information of defect b is "bulge," and the category information of defect c is "damaged," then the category information corresponding to the preset objects in each detection dimension may be "hanging cable-broken," "hanging cable-bulge," and "hanging cable-damaged".

In some embodiments, when a part is associated with a defect, the detection result of that part may include a one-to-one correspondence. For example, if part A "hanging cable" is associated with defect a "broken," then the detection result of part A may be "hanging cable-broken". When a part is associated with multiple defects, the detection result of the part may include multiple one-to-one correspondence. For example, if part A "hanging cable" is associated with defect a "broken" and defect b "bulge," then the detection result of part A may be "hanging cable-broken" and "hanging cable-bulge".

In some embodiments, the preset objects may be regarded as a database, and the comparison is to compare the association result with the category information corresponding to each detection dimension of the preset objects in the database. For example, the association results of "hanging cable-broken" and "hanging cable-bulge" exist in the database of "hanging cable-broken," "hanging cable-bulge," and "hanging cable-damaged," but the association result of "hanging cable-etched" does not exist in the database of "hanging cable-broken," "hanging cable-bulge," and "hanging cable-damaged".

702, in response to a consistent comparison result, using the detection result of the to-be-detected object corresponding to the category information of at least two detection dimensions in the association result as the target detection result corresponding to the to-be-detected object.

In some embodiments, when there is a preset object consistent with the association result in the data, the association result may be output as the final detection result; and when there is no preset object consistent with the detection result in the data, the association result may be discarded. For example, the association results of "hanging cable-broken" and "hanging cable-bulge" both exist in the database of "hanging cable-broken," "hanging cable-bulge," and "hanging cable-damaged," then the association result of "hanging cable-broken" and "hanging cable-bulge" may be output as the final detection results. Further for the association result of "hanging cable-etched" that does not exist in the database of "hanging cable-broken," "hanging cable-bulge," and "hanging cable-damaged," the association result may be discarded.

In some embodiments, when multiple to-be-detected images are being detected at the same time, the output may be the detection results of multiple parts. For example, if two to-be-detected images are being detected at the same time, the to-be-detected object in one of the images is part A, the to-be-detected object in the other to-be-detected image is part B, the detection result of part A is "hanging cable-broken" and "hanging cable-bulge," and the detection result of part B is "catenary cable-broken," then the detection result of part A and the detection result of part B may be output as the final detection result.

In the embodiments of the present disclosure, the correspondence between the category information of the associated objects in each of the detection dimensions in each of the association results may be compared with the category information corresponding to the plurality of preset objects in each of the detection dimensions. Subsequently, if the comparison results are consistent, the detection result of the to-be-detected object corresponding to the category information of at least two detection dimensions in the association result may be used as the target detection result corresponding to the to-be-detected object. In this way, the detection results can be screened to obtain more accurate detection results and improve detection accuracy.

In some embodiments, the at least two detection dimensions may include a defect detection dimension and a part detection dimension.

Figure 8:
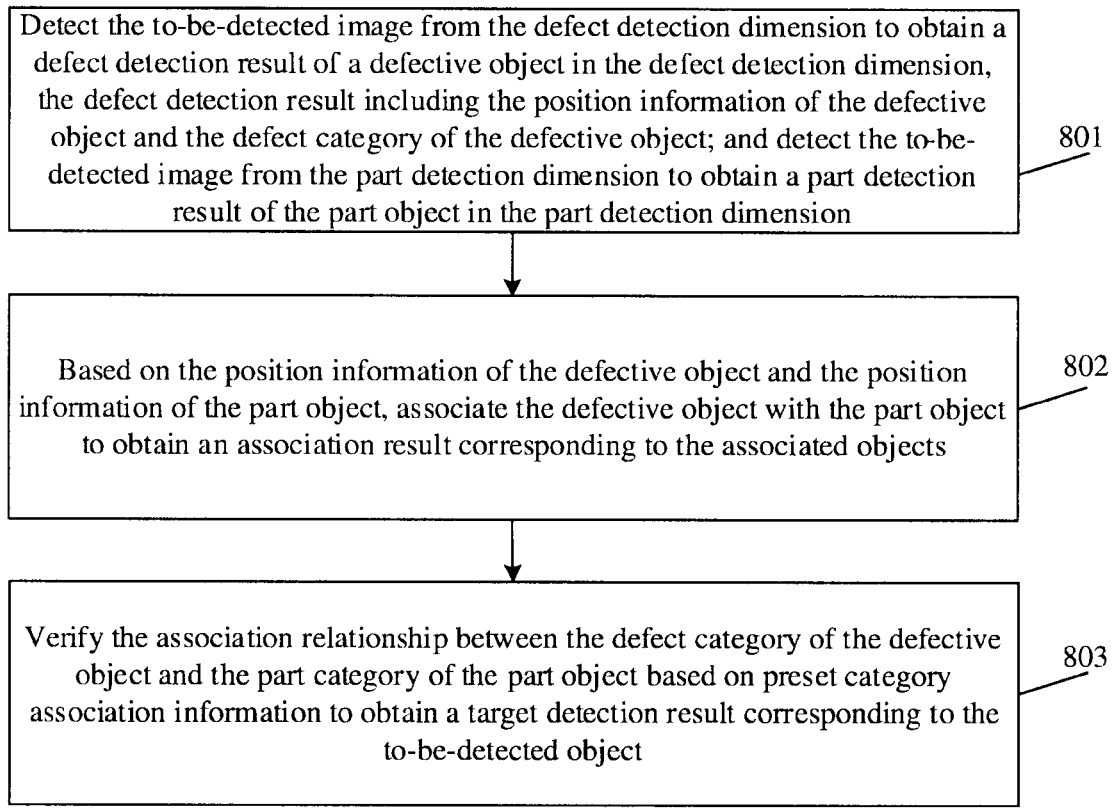
FIG. 8 is a flowchart of the image detection method according to an embodiment of the present disclosure.

FIG. 8 is a flowchart of the image detection method according to an embodiment of the present disclosure. The method will be described in detail below.

801, detecting the to-be-detected image from the defect detection dimension to obtain a defect detection result of a defective object in the defect detection dimension, the defect detection result including the position information of the defective object and the defect category of the defective object; and detecting the to-be-detected image from the part detection dimension to obtain a part detection result of the part object in the part detection dimension, the part detection result including the position information of the part object and the part category of the part object.

802, based on the position information of the defective object and the position information of the part object, associating the defective object with the part object to obtain an association result corresponding to the associated objects, the association result including an association relationship between the defect category of the defective object and the part category of the part object.

803, verifying the association relationship between the defect category of the defective object and the part category of the part object based on preset category association information to obtain a target detection result corresponding to the to-be-detected object, the category association relationship being an association relationship between the defect category and the part category.

In the embodiments of the present disclosure, the final target detection result may be obtained by detecting the to-be-detected image from the defect detection dimension and the part detection dimension, and associating and verifying the obtained defect detection result and the part detection result. In this way, false detection can be reduced and detection accuracy can be improved.

Next, an exemplary application of the embodiments of the present disclosure in an actual application scenario will be described, and a defect detection method in a complex scenario is taken as an example for the following description.

Figure 9A:
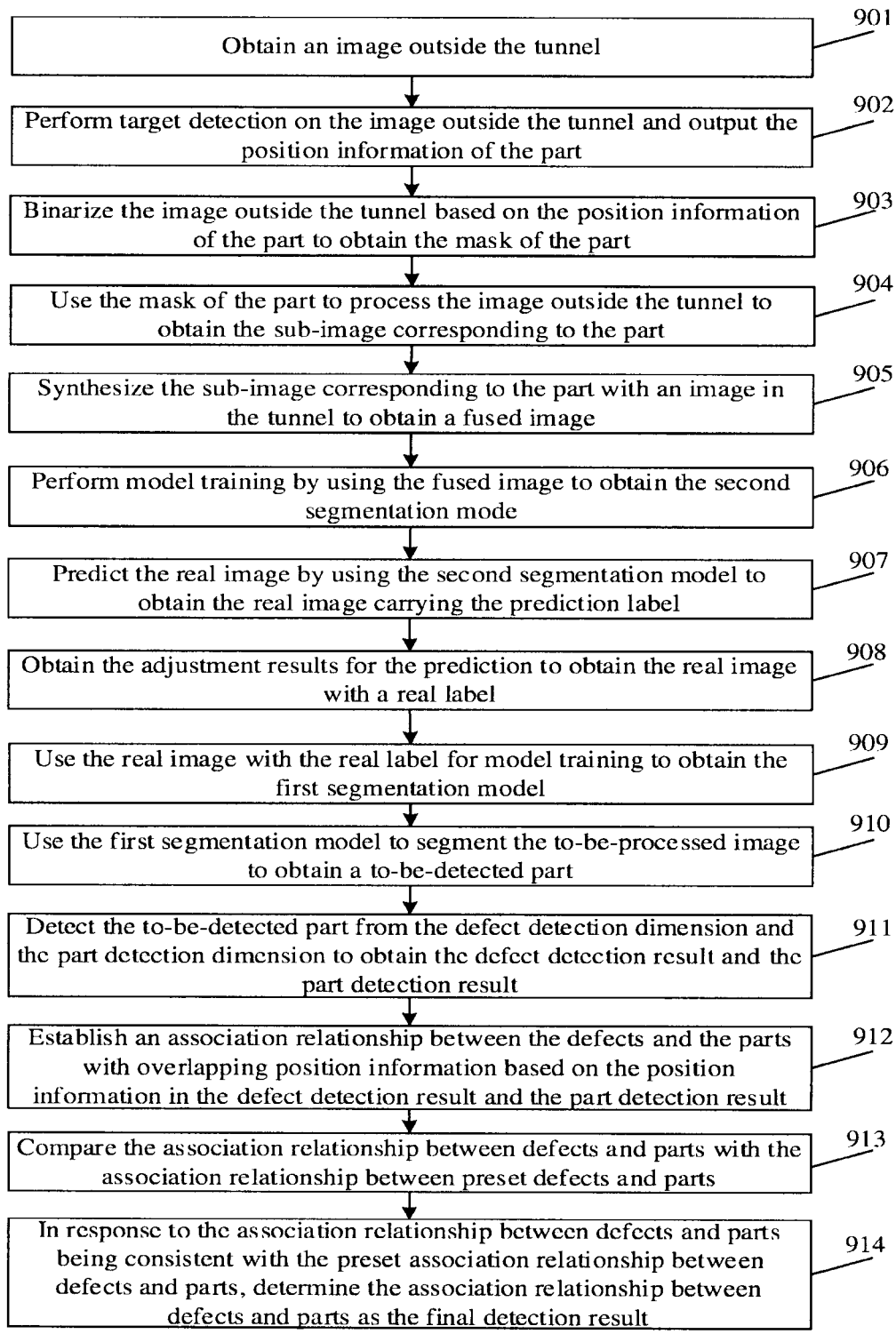
FIG. 9A is a schematic diagram showing implementation of a defect detection method in a complex scenario according to an embodiment of the present disclosure.

FIG. 9A is a schematic diagram showing implementation of a defect detection method in a complex scenario according to an embodiment of the present disclosure. The method will be described in detail below.

901, obtaining an image outside the tunnel.

In some embodiments, the image outside the tunnel may include the part and the background, and the background may be simple, that is, the part is clearly visible.

902, performing target detection on the image outside the tunnel and outputting the position information of the part.

In some embodiments, the position information of the part may correspond to the position information of the detection object described above.

903, binarizing the image outside the tunnel based on the position information of the part to obtain the mask of the part.

In some embodiments, the mask of the part may correspond to the second label described above.

904, using the mask of the part to process the image outside the tunnel to obtain the sub-image corresponding to the part.

In some embodiments, the sub-image corresponding to the part may correspond to the sub-image corresponding to the detection object described above.

905, synthesizing the sub-image corresponding to the part with an image in the tunnel to obtain a fused image.

In some embodiments, the image in the tunnel may include a background, and the background may be complex.

In some embodiments, the image in the tunnel may correspond to the sub-images corresponding to the other scenes described above.

906, performing model training by using the fused image to obtain the second segmentation model.

907, predicting the real image by using the second segmentation model to obtain the real image carrying the prediction label.

908, obtaining the adjustment results for the prediction to obtain the real image with a real label.

In some embodiments, the real label may correspond to the first label described above, and the real image may correspond to the processed image described above.

909, using the real image with the real label for model training to obtain the first segmentation model.

Figure 9B:
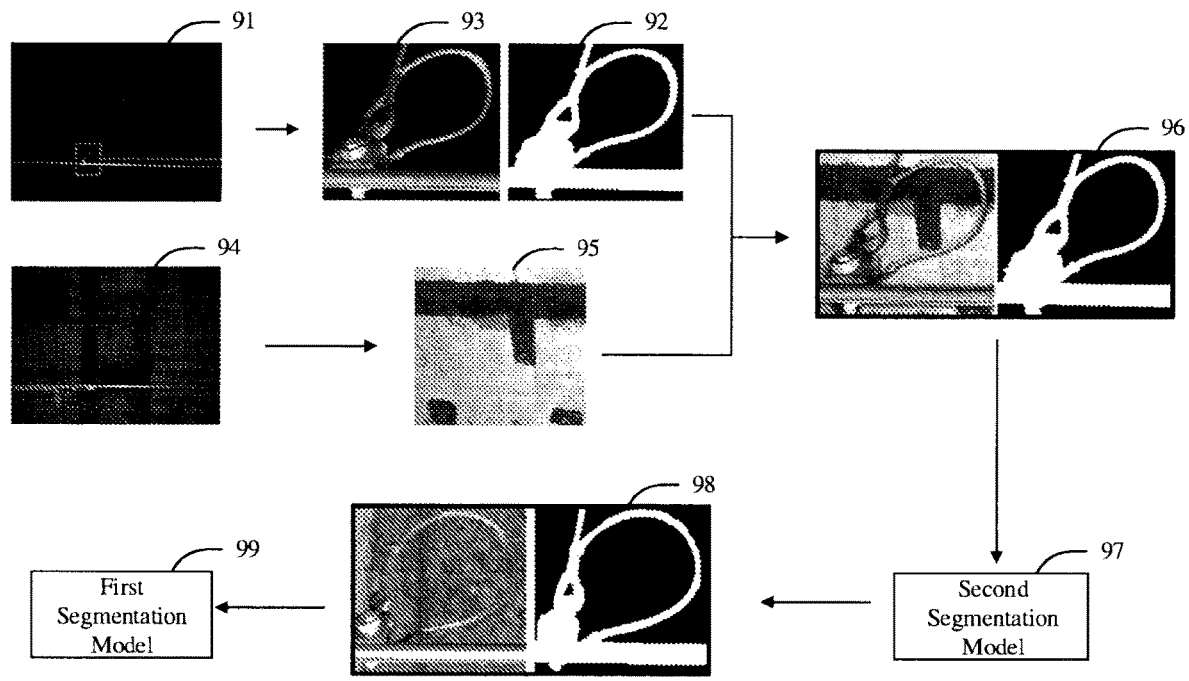
FIG. 9B is a schematic diagram showing implementation of the defect detection method in a complex scenario according to an embodiment of the present disclosure.

In some embodiments, the actual operation of processes 901 to 909 may be as shown in FIG. 9B, where 91 may represent the image outside the tunnel obtained in the process at 901, 92 may represent the mask of the part obtained in the process at 903, 93 may represent the sub-image corresponding to the part obtained in the process at 904, 94 and 95 may both represent the image in the tunnel in the process at 905, 96 may represent the fused image obtained in the process at 906, 97 may represent the second segmentation model obtained in the process at 906, 98 may represent the real image carrying the prediction label obtained in the process at 907, and 99 may represent the first segmentation model obtained in the process at 909. In practice, the fused image may be obtained by using the two following methods.

In the first method, the obtained image inside the tunnel 94 may be directly synthesized with the sub-image corresponding to the part to obtain a fused image.

In the second method, the obtained image inside the tunnel 94 may be sampled to obtain an image 95, which may be synthesized with the sub-image corresponding to the part to obtain a fused image.

910, using the first segmentation model to segment the to-be-processed image to obtain a to-be-detected part.

In some embodiments, the to-be-detected part may correspond to the to-be-detected object described above.

911, detecting the to-be-detected part from the defect detection dimension and the part detection dimension to obtain the defect detection result and the part detection result.

912, establishing an association relationship between the defects and the parts with overlapping position information based on the position information in the defect detection result and the part detection result.

913, comparing the association relationship between defects and parts with the association relationship between preset defects and parts.

In some embodiments, the preset association relationship between defects and parts may correspond to the category association information described above.

914, in response to the association relationship between defects and parts being consistent with the preset association relationship between defects and parts, determining the association relationship between defects and parts as the final detection result.

Figure 10:
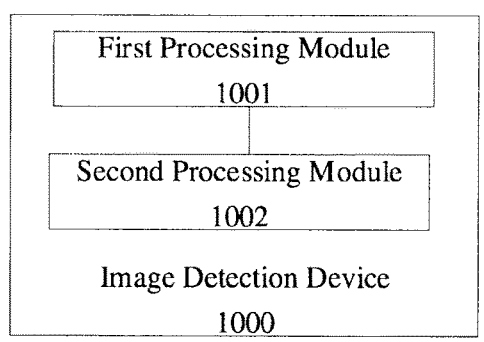
FIG. 10 is a structural block diagram of an image detection device according to an embodiment of the present disclosure.

An embodiment of the present disclosure also provides an image detection device. FIG. 10 is a structural block diagram of an image detection device 100 according to an embodiment of the present disclosure. As shown in FIG. 10, the image detection device 100 includes a first processing module 1001. The first processing module 1001 may be configured to process the to-be-processed image based on the first segmentation model to obtain the to-be-detected image corresponding to the to-be-detected object.

In some embodiments, the to-be-processed image may be obtained when the to-be-detected object is located in the scene where it is located. The first label used to train the first segmentation model may be determined based on the second segmentation model. The second segmentation model may be obtained by training a plurality of fused images carrying a second label. The fused image may be formed by fusing sub-images corresponding to the detection object and sub-images corresponding to other scenes, and the sub-images corresponding to the detection object may be determined based on the second label.

The image detection device 100 further include a second processing module 1002. The second processing module 1002 may be configured to detect the to-be-detected image to obtain the detection result corresponding to the to-be-detected object.

In some embodiments, the first segmentation model may be obtained by training a plurality of processed images carrying the first label, and the first label may be obtained by predicting the processed image based on the second segmentation model.

In some embodiments, the first processing module 1001 may include a first input module, configured to perform model training based on a plurality of fused images carrying the second label to obtain the second segmentation model; a first processing submodule, configured to use the second segmentation model to predict a plurality of processed images to obtain a plurality of processed images carrying prediction labels; a first acquisition submodule, configured to obtain an adjustment result for the prediction label for each processed image carrying the prediction label to obtain a processed image carrying the first label; and a second input module, configured to perform model training based on a plurality of processed images carrying the first label to obtain the first segmentation model.

In some embodiments, the first processing module 1001 may further include a second acquisition submodule, configured to obtain the detection image. In some embodiments, the detection image may include the detection object.

In some embodiments, the first processing module 1001 may further include a second processing submodule, configured to recognize the detection image and determine the position information of the detection object in the detection image; a third processing submodule, configured to generate a second label and the sub-image corresponding to the detection object based on the position information of the detection object and detection image; and a fourth processing submodule, configured to synthesize the sub-images corresponding to other scenes and the sub-image corresponding to the detection object into a fused image. In some embodiments, the fused image may carry the second label.

In some embodiments, the third processing submodule may include a fifth processing submodule, configured to perform binarization processing on the detection object based on the position information of the detection object to obtain the second label; and a sixth processing submodule, configured to use the second label of the detection object to process the detection image to obtain a sub-image corresponding to the detection object.

In some embodiments, the second processing module 1002 may include a first detection submodule, configured to detect the to-be-detected image from at least two detection dimensions to obtain a detection result of the to-be-detected object in each detection dimension. In some embodiments, the detection result may include position information and category information.

In some embodiments, the second processing module 1002 may further include a seventh processing submodule, configured to associate the to-be-detected objects in the at least two detection dimensions based on the position information to obtain an association result corresponding to the associated objects. In some embodiments, the association result may include category information corresponding to the associated object in each detection dimension.

In some embodiments, the second processing module 1002 may further include an eighth processing submodule, configured to verify the association result corresponding to the associated objects based on the category association information to obtain the target detection result corresponding to the to-be-detected object.

In some embodiments, the category association information may be an association relationship between the category information of at least two detection dimensions.

In some embodiments, the seventh processing submodule may include a first determination submodule, configured to determine the to-be-detected objects in at least two detection dimensions associated with the position as the associated objects based on the position information of the to-be-detected objects in the at least two detection dimensions; and a ninth processing submodule, configured to establish an association relationship between the category information of the associated objects in each of the detection dimensions to obtain the association result.

In some embodiments, the category association information may include an association relationship of each of the preset objects among the plurality of preset objects, and the association relationship may include the category information corresponding to the preset object in each detection dimension.

In some embodiments, the eighth processing submodule may include a tenth processing submodule, configured to compare the correspondence between the category information of the associated objects in each of the detection dimensions in each of the association results and the category information corresponding to the plurality of preset objects in each of the detection dimensions; and a second determination submodule, configured to use the detection result of the to-be-detected object corresponding to the category information of at least two detection dimensions in the association result as the target detection result corresponding to the to-be-detected object in response to a consistent comparison result.

In some embodiments, the at least two detection dimensions may include a defect detection dimension and a part detection dimension.

In some embodiments, the first detection submodule may include a second detection submodule, configured to detect the to-be-detected image from the defect detection dimension to obtain the defect detection result of the defective object in the defect detection dimension.

In some embodiments, the defect detection result may include the position information of the defective object and the defect category of the defective object.

In some embodiments, the first detection submodule may further include a third detection submodule, configured to detect the to-be-detected image from the part detection dimension to obtain the part detection result of the part object in the part detection dimension.

In some embodiments, part detection result may include the position information of the part object and the part category of the part object. Correspondingly, the seventh processing submodule may include a fifth processing submodule, configured to associate the defective object with the part object based on the position information of the defective object and the position information of the part object to obtain an association result corresponding to the associated objects.

In some embodiments, the association result may include an association relationship between the defect category of the defective object and the part category of the part object. Correspondingly, the eighth processing submodule may include a sixth processing submodule, configured to verify the association relationship between the defect category of the defective object and the part category of the part object based on preset category association information to obtain a target detection result corresponding to the to-be-detected object.

In some embodiments, the category association relationship may be an association relationship between the defect category and the part category.

An embodiment of the present disclosure also provides an electronic device.

Figure 11:
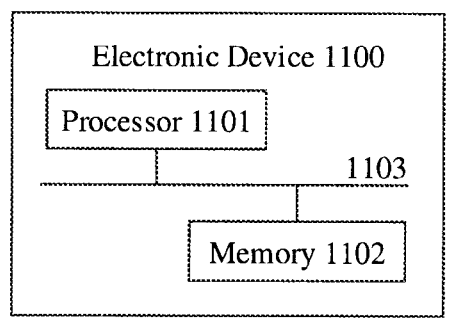
FIG. 11 is a structural block diagram of an electronic device according to an embodiment of the present disclosure.

FIG. 11 is a structural block diagram of an electronic device 1100 according to an embodiment of the present disclosure. As shown in FIG. 11, the electronic device 1100 includes a processor 1101, a memory 1102, and a communication bus 1103.

The communication bus 1103 may be used to realize the communication connection between the processor 1101 and the memory 1102, and the processor 1101 may be configured to execute the program stored in the memory 1102 to implement the image detection method described above.

An embodiment of the present disclosure further provides a computer-readable storage medium storing one or more programs. The one or more programs can be executed by one or more processors to implement the image detection method described above.

A person skilled in the art would understand that the phrases "one embodiment" or "an embodiment" referenced in this specification indicate that particular characteristics, structures, or features associated with that embodiment may be incorporated into at least one embodiment consistent with this disclosure. Therefore, the phrases "in one embodiment" or "in an embodiment" in this specification do not necessarily refer to the same embodiment. In addition, the described characteristics, structures, or features may be incorporated in one or more embodiments in any suitable manner. In various embodiments of the present invention, the sequence numbers of the above various processes or steps do not denote a preferred sequence of performing the processes or steps; and the sequence of performing the processes and steps would be determined according to the functions and internal logics thereof, which shall not cause any limitation to the implementation process of the embodiments of the present invention. The sequential numbers of the embodiments of the present invention are for description purpose only, and they do not denote preference of the embodiments.

In this specification, terms such as "comprises," "comprising," "includes," "including," "contains," "containing" or any other variation thereof, are intended to cover a non-exclusive inclusion, such that a process, method, article, or apparatus, that comprises, has, includes, contains a list of elements include not only those elements but may include other elements not expressly listed or inherent to such process, method, article, or apparatus. An element proceeded by "comprises a . . . ," "has a . . . ," "includes a . . . ," or "contains a . . . " does not, without more constraints, preclude the existence of additional identical elements in the process, method, article, or apparatus.

The devices and methods disclosed in the embodiments provided in the application may be implemented in other ways. The device embodiments described above are merely illustrative. For example, the division of units is merely a division based on logical functions and there may be other ways of division in real practice. For example, multiple units or components may be combined, or may be integrated into another system, or some features may be omitted or not performed. Additionally, coupling, direct coupling, or communication connections among the component parts as shown or discussed may be implemented through some interface(s), and indirect coupling or communication connections of devices or units may be in an electrical, mechanical, or other form.

The units described as separate components may or may not be physically independent of each other. The element illustrated as a unit may or may not be a physical unit, and it can be located at one place or deployed on a plurality of network units. A part or all of the units may be selected according to actual needs to achieve the objectives of the solutions of the embodiments.

In addition, the functional units in the various embodiments of the present invention may be integrated in one processing unit, or may exist as separate units respectively, or two or more units as described above may be integrated into one unit. The integrated unit may be practiced by means of a hardware, or may also be practiced in a form of a hardware and a software functional unit.

Persons of ordinary skill in the art can understand that, all or some processes for realizing the above-described method can be performed by hardware associated with program instructions, the program can be stored in a computer-readable storage medium, and the program, when being executed, realizes the implementation of the above method. The storage medium can include any medium that can store computer codes such as portable storage device, read-only memory (ROM), magnetic disk, or optical disk.

When the integrated unit is realized as software functional module and sold or used as an independent product, it can be stored on a computer-readable storage medium. The practical technical solution of this application can be expressed in the form of a software product, which can be stored on a storage medium and include several instructions that cause a computer device (such as a personal computer, a server, or a network device, etc.) to execute part or all of a method consistent with the disclosure. The storage medium can include any medium that can store computer codes such as portable storage device, read-only memory (ROM), magnetic disk, or optical disk.

The above examples are only exemplary embodiments of the present disclosure and are not intended to limit the scope of the disclosure. It is contemplated that various modifications and equivalent replacements may be made to the disclosure within the essence and protection scope thereof, and such modifications and replacements may be regarded as falling in the scope of the disclosure.

What is claimed is:

1. An image detection method comprising:
    processing a to-be-processed image based on a first segmentation model to obtain a to-be-detected image corresponding to a to-be-detected object, the to-be-processed image being obtained when the to-be-detected object is located in a scene; and
    detecting the to-be-detected image to obtain a detection result corresponding to the to-be-detected object;
    wherein:
        the first segmentation model is trained using a first label that is determined based on a second segmentation model, the first label being a real label obtained by adjusting a label output by the second segmentation model;
        the second segmentation model is obtained by training using at least a fused image carrying a second label, the second label being a mask or contour information corresponding to a detection object;
        the fused image is generated by fusing a sub-image corresponding to the detection object and a sub-image corresponding to another scene; and
        the sub-image corresponding to the detection object is determined based on the second label.

2. The image detection method of claim 1, wherein:
    the first segmentation model is generated by training using at least a processed image carrying the first label; and
    the first label is obtained by performing prediction on the processed image based on the second segmentation model.

3. The image detection method of claim 1, wherein training of the first segmentation model includes:
    performing model training based on at least the fused image carrying the second label to obtain the second segmentation model;
    performing prediction on at least a processed image using the second segmentation model to obtain at least a processed image carry a prediction label;
    obtaining an adjustment result for the prediction label to obtain the processed image carrying the first label; and
    performing model training based on at least the processed image carrying the first label to obtain the first segmentation model.

4. The image detection method of claim 1, wherein obtaining of the fused image includes:
    obtaining a detection image, the detection image including the detection object;
    performing recognition on the detection image to determine position information of the detection object in the detection image;
    generating the second label and the sub-image corresponding to the detection object based on the position information of the detection object and the detection image; and
    synthesizing the sub-image corresponding to the other scene and the sub-image corresponding to the detection object into the fused image, the fused image carrying the second label.

5. The image detection method of claim 4, wherein generating the second label and the sub-image corresponding to the detection object based on the position information of the detection object and the detection image includes:
    performing binarization processing on the detection object to obtain the second label of the detection object based on the position information of the detection object; and
    processing the detection image by using the second label of the detection object to obtain the sub-image corresponding to the detection object.

6. The image detection method of claim 1, wherein detecting the to-be-detected image to obtain the detection result corresponding to the to-be-detected object includes:
    detecting the to-be-detected image from at least two detection dimensions to obtain a detection result of the to-be-detected object in each of the at least two detection dimensions, the detection result including position information and category information;
    associating the to-be-detected object in the at least two detection dimensions based on the position information to obtain an association result corresponding to an associated object, the association result including the category information corresponding to the associated object in each of the at least two detection dimensions; and
    verifying the association result based on category association information to obtain a target detection result corresponding to the to-be-detected object, the category association information being an association relationship between the category information of at least two detection dimensions.

7. The image detection method of claim 6, wherein associating the to-be-detected object in the at least two detection dimensions based on the position information to obtain the association result includes:
    determining the to-be-detected object in the at least two detection dimensions with associated position as the associated object based on the position information of the to-be-detected object in the at least two detection dimensions; and
    establishing a correspondence between the category information of the associated object in each of the at least two detection dimensions to obtain the association result.

8. The image detection method of claim 6, wherein:
the category association information includes an association relationship of each of a plurality of preset objects, and for each preset object of the plurality of preset object, the association relationship includes the category information corresponding to the preset object in each of the at least two detection dimensions; and
verifying the association result based on the category association information to obtain the target detection result corresponding to the to-be-detected object includes:
  comparing a correspondence between the category information of the associated object in the at least two detection dimensions in the association result and the category information corresponding to the plurality of preset objects in each of the at least two detection dimensions; and
  determining the detection result of the to-be-detected object corresponding to the category information of the at least two detection dimensions in the association result as the target detection result corresponding to the to-be-detected object in response to a consistent comparison result.

9. The image detection method of claim 6, wherein:
the at least two detection dimensions include a defect detection dimension and a part detection dimension;
detecting the to-be-detected image from the at least two detection dimensions to obtain the detection result of the to-be-detected object in each of the at least two detection dimensions includes:
  detecting the to-be-detected image from the defect detection dimension to obtain a defect detection result of a defective object in the defect detection dimension, the defect detection result including position information of the defective object and a defect category of the defective object; and
  detecting the to-be-detected image from the part detection dimension to obtain a part detection result of a part object in the part detection dimension, the part detection result including position information of the part object and a part category of the part object;
associating the to-be-detected object in the at least two detection dimensions based on the position information to obtain the association result includes:
  associating the defective object with the part object to obtain the association result based on the position information of the defective object and the position information of the part object, the association result including an association relation between the defect category of the defective object and the part category of the part object; and
verifying the association result based on the category association information to obtain the target detection result includes:
  verifying the association relation between the defect category of the defective object and the part category of the part object based on the category association information to obtain the target detection result.

10. An electronic device comprising:
a processor; and
a memory storing a program that, when executed, causes the processor to:
  process a to-be-processed image based on a first segmentation model to obtain a to-be-detected image corresponding to a to-be-detected object, the to-be-processed image being obtained when the to-be-detected object is located in a scene; and
  detect the to-be-detected image to obtain a detection result corresponding to the to-be-detected object;
wherein:
  the first segmentation model is trained using a first label that is determined based on a second segmentation model, the first label being a real label obtained by adjusting a label output by the second segmentation model;
  the second segmentation model is obtained by training using at least a fused image carrying a second label, the second label being a mask or contour information corresponding to a detection object;
  the fused image is generated by fusing a sub-image corresponding to the detection object and a sub-image corresponding to another scene; and
  the sub-image corresponding to the detection object is determined based on the second label.

11. The electronic device of claim 10, wherein:
the first segmentation model is generated by training using at least a processed image carrying the first label; and
the first label is obtained by performing prediction on the processed image based on the second segmentation model.

12. The electronic device of claim 10, wherein training of the first segmentation model includes:
  performing model training based on at least the fused image carrying the second label to obtain the second segmentation model;
  performing prediction on at least a processed image using the second segmentation model to obtain at least a processed image carry a prediction label;
  obtaining an adjustment result for the prediction label to obtain the processed image carrying the first label; and
  performing model training based on at least the processed image carrying the first label to obtain the first segmentation model.

13. The electronic device of claim 10, wherein obtaining of the fused image includes:
  obtaining a detection image, the detection image including the detection object;
  performing recognition on the detection image to determine position information of the detection object in the detection image;
  generating the second label and the sub-image corresponding to the detection object based on the position information of the detection object and the detection image; and
  synthesizing the sub-image corresponding to the other scene and the sub-image corresponding to the detection object into the fused image, the fused image carrying the second label.

14. The electronic device of claim 13, wherein generating the second label and the sub-image corresponding to the detection object based on the position information of the detection object and the detection image includes:
  performing binarization processing on the detection object to obtain the second label of the detection object based on the position information of the detection object; and
  processing the detection image by using the second label of the detection object to obtain the sub-image corresponding to the detection object.

15. The electronic device of claim 10, wherein the program further causes the processor to detect the to-be-detected image to obtain the detection result corresponding to the to-be-detected object by:

detecting the to-be-detected image from at least two detection dimensions to obtain a detection result of the to-be-detected object in each of the at least two detection dimensions, the detection result including position information and category information;

associating the to-be-detected object in the at least two detection dimensions based on the position information to obtain an association result corresponding to an associated object, the association result including the category information corresponding to the associated object in each of the at least two detection dimensions; and verifying the association result based on category association information to obtain a target detection result corresponding to the to-be-detected object, the category association information being an association relationship between the category information of at least two detection dimensions.

16. The electronic device of claim 15, wherein the program further causes the processor to associating the to-be-detected object in the at least two detection dimensions based on the position information to obtain the association result includes:

determining the to-be-detected object in the at least two detection dimensions with associated position as the associated object based on the position information of the to-be-detected object in the at least two detection dimensions; and establishing a correspondence between the category information of the associated object in each of the at least two detection dimensions to obtain the association result.

17. The electronic device of claim 15, wherein:

the category association information includes an association relationship of each of a plurality of preset objects, and for each preset object of the plurality of preset object, the association relationship includes the category information corresponding to the preset object in each of the at least two detection dimensions; and the program further causes the processor to verify the association result based on the category association information to obtain the target detection result corresponding to the to-be-detected object by:

comparing a correspondence between the category information of the associated object in the at least two detection dimensions in the association result and the category information corresponding to the plurality of preset objects in each of the at least two detection dimensions; and determining the detection result of the to-be-detected object corresponding to the category information of the at least two detection dimensions in the association result as the target detection result corresponding to the to-be-detected object in response to a consistent comparison result.

18. The electronic device of claim 15, wherein:

the at least two detection dimensions include a defect detection dimension and a part detection dimension;

the program further causes the processor to detect the to-be-detected image from the at least two detection dimensions to obtain the detection result of the to-be-detected object in each of the at least two detection dimensions by:

detecting the to-be-detected image from the defect detection dimension to obtain a defect detection result of a defective object in the defect detection dimension, the defect detection result including position information of the defective object and a defect category of the defective object; and detecting the to-be-detected image from the part detection dimension to obtain a part detection result of a part object in the part detection dimension, the part detection result including position information of the part object and a part category of the part object;

the program further causes the processor to associate the to-be-detected object in the at least two detection dimensions based on the position information to obtain the association result by:

associating the defective object with the part object to obtain the association result based on the position information of the defective object and the position information of the part object, the association result including an association relation between the defect category of the defective object and the part category of the part object; and the program further causes the processor to verify the association result based on the category association information to obtain the target detection result by:

verifying the association relation between the defect category of the defective object and the part category of the part object based on the category association information to obtain the target detection result.

19. A non-transitory computer-readable storage medium containing computer-executable instructions that, when executed by a processor, cause the processor to perform the image detection method according to claim 1.

20. An image detection method comprising:

processing a to-be-processed image based on a first segmentation model to obtain a to-be-detected image corresponding to a to-be-detected object, the to-be-processed image being obtained when the to-be-detected object is located in a scene; and detecting the to-be-detected image to obtain a detection result corresponding to the to-be-detected object, including:

detecting the to-be-detected image from a defect detection dimension to obtain a defect detection result of a defective object in the defect detection dimension, the defect detection result including position information of the defective object and a defect category of the defective object;

detecting the to-be-detected image from a part detection dimension to obtain a part detection result of a part object in the part detection dimension, the part detection result including position information of the part object and a part category of the part object;

associating the defective object with the part object to obtain an association result based on the position information of the defective object and the position information of the part object, the association result including an association relation between the defect category of the defective object and the part category of the part object; and verifying the association relation between the defect category of the defective object and the part category of the part object based on a category association information to obtain the detection result.

* * * * *